June 14, 1955 D. H. CAMPBELL 2,710,918

MULTIVIBRATOR FREQUENCY DIVIDER

Filed Jan. 31, 1950

INVENTOR.
DAVID H. CAMPBELL
BY William P. Lane
ATTORNEY 2,710,918
Patented June 14, 1955

2,710,918

MULTIVIBRATOR FREQUENCY DIVIDER

David H. Campbell, Los Angeles, Calif., assignor to North American Aviation, Inc.

Application January 31, 1950, Serial No. 141,360
7 Claims. (Cl. 250—36)

This invention pertains to frequency dividers of the multivibrator type in which a relatively high exciting frequency is applied to a multivibrator, and a submultiple of the exciting frequency is obtained as the output. It particularly pertains to a multivibrator frequency divider which is dependable and insensitive to fluctuations in heater current and plate voltage.

In a multivibrator frequency divider a series of input pulses is used to periodically charge and discharge a condenser through one or more resistors. Since any combination of resistors with a condenser has a finite time constant which may be expressed as the sum of the resistances of the resistors connected in series with the condenser, multiplied by the capacitance of the condenser, the multivibrator will have a time constant which is dependent at least indirectly upon the values of these resistances. In frequency dividers employing multivibrators, at least one of the resistances in series with the capacitance of the condenser to be charged to produce the finite time constant is the resistance between elements of a vacuum tube. Herein lies the difficulty, because fluctuations in plate voltage and fluctuations in voltage applied to the filament of a vacuum tube cause changes in characteristics of the tube, and specifically cause changes in the effective resistance between any two of the tube elements.

This invention contemplates a scheme for automatically compensating for changes in resistance between elements in the vacuum tube so as to maintain at a constant value the effective time constant of a circuit in which one of the resistance values is between two elements in a vacuum tube.

It is an object of this invention to provide a simplified multivibrator frequency divider.

It is another object of this invention to provide a multivibrator frequency divider having a linear discharge slope.

It is another object of this invention to provide a multivibrator frequency divider which is insensitive to changes in plate voltage.

It is another object of this invention to provide a multivibrator frequency divider which is insensitive to changes in filament current.

It is another object of this invention to provide a multivibrator frequency divider which is economical of plate current.

It is another object of this invention to provide a multivibrator frequency divider with reduced grid-dissipation in the tube thereof.

It is another object of this invention to provide a multivibrator frequency divider in which the condenser charging time is relatively small.

Other objects of invention will become apparent from the following description taken in connection with the accompanying drawings, in which.

Figure 1:
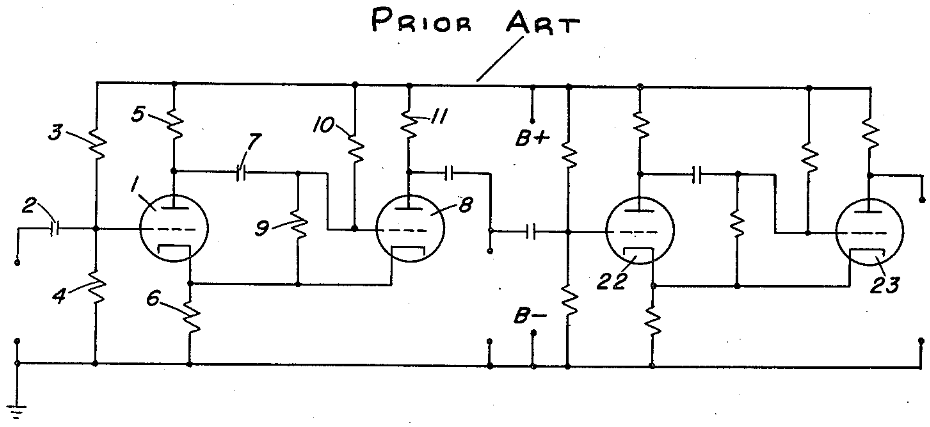
Fig. 1 is a conventional multivibrator frequency divider.

Referring first to Fig. 1, there is shown a conventional multivibrator frequency divider for attaining a division ratio of 10 with an input of, for example, 20 kilocycles to a vacuum tube 1; a division ratio of 10 down to 2 kilocycles is attained in two stages of division. The input signal is fed through a capacitor 2 to triode 1 with resistors 3 and 4 connected between the grid of tube 1 and B+ and B— respectively. Plate resistor 5 and cathode resistor 6 are connected to B+ and B— respectively. Whenever reference is made herein to B+ and B— it is to be understood that what is meant is the positive and negative direct current plate supply voltage for furnishing space current to the vacuum tubes. Condenser 7 connects the plate of tube 1 to triode 8, with resistor 9 connected between the grid and cathode of triode 8. Resistors 10 and 11 connect the grid and plate, respectively, of triode 8 to B+. The time constant of the circuit shown in Fig. 1 can be determined by multiplying the resistance of the various resistors in series with condenser 7 by the capacitance of condenser 7. These resistances are the resistance of resistors 5, 6 and 9 taken in parallel with the grid-to-cathode resistance of triode 8. In other words, in order to charge condenser 7, electrons must flow from B— through the resistance of resistor 6, through the resistance of resistor 9 and the effective resistance offered to electrons by the path between the cathode and grid of triode 8. These elctrons then flow to the right-hand side of condenser 7, and the path to B+ is completed by resistor 5. A similar analysis applies to the succeeding stage of the divider represented by triodes 22 and 23 and their associated resistors and condensers. If, in this conventional multivibrator frequency divider, a shift occurs in the temperature of the heaters of vacuum tubes 1 and 8, the cathodes of these tubes become brighter, emitting more electrons. If more electrons are emitted from the cathode of triode 8 the effective resistance between the cathode of triode 8 and the grid of triode 8 is decreased. This decrease in effective cathode-to-grid resistance has two deleterious effects. First, the time constant formed by the product of the capacitance of condenser 7 and the resistances aforementioned is decreased, affecting thereby the repetition period of the circuit. Secondly, if the cathode of triode 8 becomes materially hotter, so many electrons may be collected by the grid of triode 8 that secondary emissions from the grid may occur. This, too, would change the parameters of triode 8 and thereby materially affect the repetition rate of the circuit. It can be seen that if the heater of triode 1 increases in temperature over some mean value, a greater flow of electrons will occur through triode 1, resulting in a greater flow of current through resistor 5, thus again decreasing the time constant of the circuit. Obviously then, the effects of increasing cathode temperatures in the circuit of Fig. 1 are additive, and do not in any way cancel out.

If the plate voltages applied to the plates of triodes 1 and 8 rise sharply, again there is an increase in the flow of electrons through these tubes and an effective decrease in their cathode-to-grid resistances. Here again, the time constant of the circuit, and consequently its repetition rate, are materially affected and the effects of varying the plate voltage of the two tubes in the same direction are additive and do not in any way cancel out.

Figure 2:
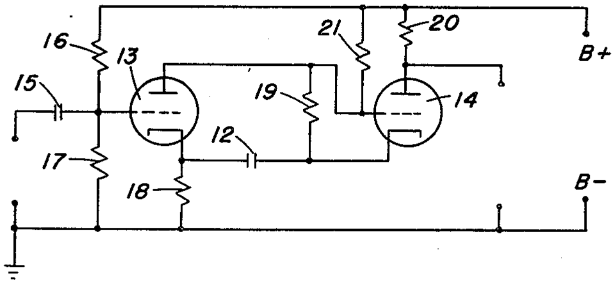
Fig. 2 is a circuit diagram of the improved multivibrator frequency divider of this invention.

Referring now to Fig. 2, a condenser 12 corresponding to condenser 7 in Fig. 1 is connected between the cathodes of triodes 13 and 14. Condenser 12 effectively couples the cathodes of triode 13 and triode 14. Again, the input signal is applied through a condenser 15 biased between B+ and B— by the resistance of resistors 16 and 17 respectively, and cathode bias is supplied by the resistance of resistor 18 on triode 13. The plate and grid of triode 14 are connected to B+ through resistors 20 and 21. Resistors 16 and 21 are provided to cause the multivibrator to respond to higher frequencies, for example, of the order of five megacycles. However, resistors 16 and 21 are not essential to this invention when the invention is used at lower frequencies. When resistors 16 and 21 are omitted, there is no connection between the grid of either triodes 13 or 14 and B. In this circuit, condenser 12 is charged by a circuit including the resistance of resistors 18 and 20 and the cathode-to-plate resistance of triode 14. Tube 13 is biased to cut off by the charging current flowing in resistor 18. When condenser 12 is charged, current decreases in resistor 18, and tube 13 starts to conduct. Condenser 12 is discharged through tube 13 and resistor 19. The flow of discharge current through resistor 19 cuts off current flow in tube 14. When condenser 12 is discharged, charging current starts to flow again through tube 12. Note, that no cathode-to-grid resistance is employed in charging the condenser. There is at once obviated any difficulty due to secondary emissions of the grid. Assuming fluctuation in the heater temperatures of triodes 13 and 14, the cathode-to-plate resistance of both triodes 13 and 14 will be reduced, allowing a greater flow of electrons. However, as the temperature of the cathode of triode 14 is increased, the temperature of the cathode of triode 13 is also increased, allowing more electrons to appear on the plate of triode 13 and consequently increasing the charge on the grid of triode 14 connected thereto. This increase in the charge on the grid of triode 14 tends to discourage the flow of electrons through triode 14 to exactly the same extent as their flow was encouraged by the increase in temperature of the cathode of triode 14. It is, therefore, apparent that fluctuating the temperature of the cathodes of triodes 13 and 14 has a net zero effect on the performance of the circuit, and the repetition rate thereof remains substantially constant.

Assuming now a fluctuation—say an increase, in plate voltage, the effective cathode-to-plate resistance of triode 14 decreases, allowing momentarily for an increase in the flow of electrons therethrough. However, an increase in the plate supply voltage is reflected on the grid of triode 14 due to a corresponding increase in the potential of the space charge at every point between the plate and cathode of triode 14; an increase in potential of the grid of triode 14 is also an increase in potential of the plate of triode 13; an increase in potential of the plate of triode 13 is reflected on the grid of triode 13 due to a corresponding increase in potential at every point between the plate and cathode of triode 13; an increase in voltage in the positive direction on the grid of triode 13 causes an increment of electrons to flow through triode 13 and resistor 19 which decreases the potential of the grid of triode 14, effectively increasing the cathode-to-plate resistance of that tube. Here again, a fluctuation in the plate voltage is effectively cancelled and does not materially vary the repetition rate of the circuit. Because of this increase in dependability and freedom from effect due to fluctuations in supply voltages, the division factor of the circuit can be increased materially over the arrangement shown in Fig. 1. In addition, since the value of the cathode-to-plate resistance of triode 14 is much smaller than the cathode-to-grid resistance of triode 8 in Fig. 1, the charging time constant of the circuit is materially reduced, thus allowing a steeper wave form. In addition, it is possible to use a somewhat larger capacitance for condenser 12 than for condenser 7 because the cathode-to-plate current path in Fig. 2 is capable of passing much more current in a given small amount of time than is the corresponding cathode-to-grid path of triode 8 in Fig. 1. The peak potential across condenser 12 is then much larger than the peak potential across condenser 7. With a higher potential across condenser 12 at the termination of its charge, the discharge slope is more linear than the discharge slope of condenser 7, providing a more dependable triggering action with the synchronizing signal.

Following are preferred circuit values and components for the circuit shown in Fig. 2:

| Circuit Element | Value |
|---|---|
| 12 | 0.01 Mfd. |
| 13 | Low mu triodes such as 6C4 or 6SN7. |
| 14 | |
| 15 | 0.0006 Mfd. |
| 16 | 1.0 Megohm. |
| 17 | 0.5 Megohm. |
| 18 | 5000 Ohms. |
| 19 | 0.5 Megohm. |
| 20 | 250 Ohms. |
| 21 | 2.0 Megohms. |

With these values the circuit attains a division ratio of 10.0 without detectable variation over a range of plate supply voltage and heater current of plus or minus twenty percent of the mean values.

When resistors 16 and 21 are omitted from the embodiment shown in Fig. 2 the values of the circuit parameters, shown in the table above, are naturally changed. A set of typical values are as follows:

| Circuit Element | Value |
|---|---|
| 12 | 0.01 Mfd. |
| 13 | Low mu triodes such as 6C4 or 6SN7. |
| 14 | |
| 15 | 0.005 Mfd. |
| 17 | 1800 Ohms. |
| 18 | 22,000 Ohms. |
| 19 | 0.9 Megohms. |
| 20 | 12,000 Ohms. |

Although the invention has been described and illustrated in detail, it is to be clearly understood that the same is by way of illustration and example only and is not to be taken by way of limitation, the spirit and scope of this invention being limited only by the terms of the appended claims.

I claim:

1. A multivibrator frequency divider comprising first and second vacuum tubes each having a plate, a cathode, a filament and a control grid, means including a source of direct current energy for supplying space current to said second tube, a storage condenser connected between the cathodes of said two vacuum tubes, a resistor connected between the cathode of said second tube and the plate of said first tube, the plate of said first tube being connected directly to the grid of said second tube, a voltage divider connected between the positive and negative terminals of said source of direct current energy and connected at its point of division to the grid of said first vacuum tube, a resistor connected from the cathode of said first vacuum tube to said negative terminal and a resistor from the grid of said second vacuum tube to said positive terminal whereby the time constant and repetition rate of said multivibrator is substantially independent of fluctuations in said source of direct current energy or in the filament power supply for said tubes.

2. A multivibrator frequency divider having increased stability comprising a storage condenser; means including a vacuum tube having a cathode, a grid, and a plate, and a source of direct current, connected to said condenser to supply charging current thereto means responsive to an alternating current exciting signal including a second vacuum tube having a grid, a plate, a filament and a cathode, and a resistor in series with said last-named plate connected to said condenser to control the rate at which said storage condenser is charged and discharged; said storage condenser being connected between the cathodes of said two vacuum tubes; and a resistor connected between the cathode of said first vacuum tube and the negative terminal of said source of direct current energy; whereby the frequency of an output signal taken from the plate of said first-named vacuum tube is independent of fluctuations in the supply voltage for said plates and filaments.

3. A multivibrator frequency divider comprising a first and second vacuum tube each having a cathode, a grid, and a plate, a storage condenser connected between the cathodes of said vacuum tubes, a conductive connection from the plate of the first said vacuum tube to the grid of the second said vacuum tube, a resistive connection between the grid and cathode of said second vacuum tube, a source of direct current energy for furnishing space current to said second vacuum tube, a resistor connected between the cathode of said first vacuum tube and the negative terminal of said source of direct current energy, means for applying a constant frequency pulse to the grid of said first vacuum tube, and a conductive connection to the plate of said second tube for detecting a submultiple of said constant frequency pulse.

4. In combination in a multivibrator frequency divider, two triode vacuum tubes, conductive means including a voltage source for supplying direct current to the plate of the second of said vacuum tubes, an input circuit for supplying constant frequency pulses to said first vacuum tube including biasing means, a conductive connection between the plate of said first vacuum tube and the grid and cathode of said second vacuum tube including a resistor between said last-named plate and cathode, a resistive connection bttween the cathode of said first vacuum tube and the negative side of said plate supply, and a capactive coupling means between the cathodes of said vacuum tubes.

5. A multivibrator frequency divider comprising two triode vacuum tubes each having a grid, a plate, a cathode, and a filament, a source of direct current having positive and negative terminals for furnishing space current to said vacuum tubes, a voltage divider connected at its ends to said positive and negative terminals and at its midpoint to the grid of the first of said two vacuum tubes, a storage condenser connected between the cathodes of said vacuum tubes, a conductive connection between the plate of said first tube and the grid of said second tube, a resistive connection between the grid and cathode of said second tube, resistive connections between said positive terminal and the plates of both of said tubes, and between said negative terminal and the cathode of said first tube whereby fluctuations in the temperature of said filaments and in the potential of said source of direct current do not affect the ratio between the frequency of pulses applied to the grid of said first tube and the frequency of pulses derivable from the plate of said second tube.

6. A multivibrator frequency divider comprising two triode vacuum tubes each having a grid, a plate, a cathode, and a filament, a source of direct current having positive and negative terminals, a resistor between the grid of the first of said vacuum tubes and the negative terminal of said source of direct current, a storage condenser connected between the cathodes of said vacuum tubes, a resistive connection between the cathode of said first vacuum tube and the negative terminal of said source of direct current, a conductive connection between the plate of said first tube and the grid of said second tube, a resistive connection between the grid and cathode of said second tube, a resistive connection between said positive terminal and the plate of said second tube, whereby fluctuations in the temperature of said filament and the potential of said source of direct current do not affect the ratio between the frequency of pulses applied to the grid of said first tube and the frequency of pulses derivable from the plate of said second tube.

7. A multivibrator frequency divider for dividing the frequency of voltages above a predetermined frequency comprising a first and second vacuum tube, a source of direct current energy, capacitive coupling means between the cathodes of said tubes comprising a storage condenser and a resistor, said condenser being connected between the cathode of said first vacuum tube and the cathode of said second vacuum tube, said resistor being connected between the cathode of said first vacuum tube and the negative terminal of said source of direct current energy, a resistor connected between the cathode of said second vacuum tube and the plate of said first vacuum tube, the plate of said first vacuum tube being connected directly to the control grid of said second vacuum tube, a resistor connected between the control grid of said first vacuum tube and the negative terminal of said source of direct current energy, and a resistor from the plate of said second vacuum tube to the positive terminal of said source of direct current energy whereby the time constant and repetition rate of said multivibrator is substantially independent of fluctuations in said source of direct current energy or in the filament power supply for said tubes.

References Cited in the file of this patent

UNITED STATES PATENTS

| | | |
|---|---|---|
| 2,417,286 | Bartels | Mar. 11, 1947 |
| 2,588,240 | Houghton | Mar. 4, 1952 |

OTHER REFERENCES

Review of Scientific Instruments, vol. 20, No. 1, pages 78–80 (January 1949).